United States Patent [19]

Cutright et al.

[11] Patent Number: 5,019,024
[45] Date of Patent: May 28, 1991

[54] TENSIONING AND GLUING METHODS AND APPARATUS FOR TUBE WINDING MACHINES

[75] Inventors: Edwin L. Cutright, Powhatan; Billy J. Keen, Jr., Chesterfield; G. Robert Scott, Midlothian; Peter C. Van Davelaar, Richmond, all of Va.

[73] Assignee: Philip Morris Incorporated, New York, N.Y.

[21] Appl. No.: 493,755

[22] Filed: Mar. 15, 1990

[51] Int. Cl.$^5$ .................. B31C 3/00; B31C 11/04
[52] U.S. Cl. .................. 493/280; 493/279; 493/299; 493/337
[58] Field of Search .................. 156/95, 195; 493/24, 493/279, 280, 282, 283, 299, 300, 301, 335, 336, 337

[56] References Cited

U.S. PATENT DOCUMENTS

| | | |
|---|---|---|
| 388,462 | 8/1888 | Tainter . |
| 427,705 | 5/1890 | McCracken . |
| 441,845 | 12/1890 | Hurlbut . |
| 444,950 | 1/1891 | Denney . |
| 507,764 | 10/1893 | Spengler . |
| 573,004 | 12/1896 | Knight et al. . |
| 616,044 | 12/1898 | Wilson et al. . |
| 692,636 | 2/1902 | Denney . |
| 1,252,235 | 1/1918 | Carper . |
| 1,660,832 | 2/1928 | Conti . |
| 1,949,237 | 2/1934 | Bradner .................. 226/95 |
| 1,990,481 | 2/1935 | Garling .................. 93/80 |
| 2,048,360 | 7/1935 | Spanel et al. .................. 18/51 |
| 2,128,564 | 8/1938 | Schoen et al. .................. 93/80 |
| 2,130,355 | 9/1938 | Magill .................. 93/94 |
| 2,212,915 | 8/1940 | Dieffenbach .................. 93/80 |
| 2,259,577 | 10/1941 | Morgan et al. .................. 493/279 |
| 2,984,182 | 5/1961 | Fienup et al. .................. 102/42 |
| 3,136,231 | 6/1964 | Hoyt .................. 93/80 |
| 3,159,515 | 12/1964 | Dunlap et al. .................. 156/190 |
| 3,196,762 | 7/1965 | Schmeltz .................. 93/94 |
| 3,203,325 | 8/1965 | Davis et al. .................. 93/80 |
| 3,338,270 | 8/1967 | Denenberg .................. 138/144 |
| 3,398,037 | 8/1968 | Elam et al. .................. 156/428 |
| 3,400,029 | 9/1968 | Mesrobian et al. .................. 156/82 |
| 3,430,543 | 3/1969 | Cunningham .................. 93/94 |
| 3,520,276 | 7/1970 | Martin .................. 118/674 |
| 3,524,779 | 8/1970 | Masters et al. .................. 156/190 |
| 4,473,368 | 9/1984 | Meyer .................. 493/34 |
| 4,910,943 | 3/1990 | Taylor et al. .................. 226/95 |

Primary Examiner—Frederick R. Schmidt
Assistant Examiner—John A. Marlott
Attorney, Agent, or Firm—Robert R. Jackson

[57] ABSTRACT

One or more tapes being pulled toward the mandrel of a tube winding machine are tensioned by passing them over vacuum chambers. Glue is applied to one or more tapes adjacent the vacuum chambers. If the tube winding machine stops for any reason, the vacuum chambers keep the tapes to which glue is applied taut, and those tapes are moved out of contact with the glue applying member. The length of each tape which is in contact with the glue applying member can be adjusted to adjust the amount of glue applied to the tape. Heat can be applied to each tape after glue has been applied in order to promote curing of the glue.

28 Claims, 6 Drawing Sheets

TENSIONING AND GLUING METHODS AND APPARATUS FOR TUBE WINDING MACHINES

BACKGROUND OF THE INVENTION

This invention relates to tube winding machines, and more particularly to improved methods and apparatus for tensioning and applying glue to the strips of paper or other materials being wound.

Tube making apparatus in which several strips or tapes of paper or other similar materials are wound around a mandrel in overlapping helixes to form a continuous tube are well known as shown, for example, by Meyer U.S. Pat. No. 4,473,368. Glue is typically applied to at least some of the strips prior to winding in order to hold the tapes together in the finished tube. The quality and uniformity of the finished tube depends to a significant degree on the amount and uniformity of the tension applied to the strips going to the mandrel. Different amounts of tension may be required for different strips for such reasons as the position of the strip in the finished tube (i.e., whether the strip is the inner strip, the outer strip, or an intermediate strip in the finished tube) and the tensile strength of the strip. It is also desirable to be able to individually adjust the amount of glue applied to each strip, to completely remove all strips from contact with the glue source when the machine is stopped, and to ensure that the tapes cannot become entangled in the glue applying mechanism in the event that a tape breaks or under any other machine operating condition.

In view of the foregoing, it is an object of this invention to improve the mechanisms used for tensioning and applying glue to the tapes going to the mandrel of a spiral tube winding machine.

It is a more particular object of this invention to provide tensioning and glue applying mechanisms of the type mentioned above in which the amount of tension applied to each tape can be easily and individually adjusted.

It is another more particular object of this invention to provide tensioning and glue applying mechanisms of the type mentioned above in which the amount of glue applied to each tape can be easily and individually controlled.

It is still another more particular object of this invention to provide tensioning and glue applying mechanisms of the type mentioned above in which the tapes are automatically removed from contact with the glue applying component whenever the tube winding machine stops.

It is yet another more particular object of this invention to provide tensioning and glue applying mechanisms of the type mentioned above in which the tapes are positively controlled both before and after the point at which the glue is applied to prevent the tapes from becoming entangled in the glue applying components in the event that a tape breaks or under any other machine operating condition.

SUMMARY OF THE INVENTION

These and other objects of the invention are accomplished in accordance with the principles of the invention by passing at least some of the tapes going to the mandrel of the tube winding machine over the surface of a chamber having a reduced gas pressure inside and therefore referred to herein as a vacuum chamber. The vacuum chamber surface over which a tape is passed is perforated, and the reduced pressure inside the chamber is preferably adjustable. Accordingly, the frictional drag on the tape can be adjusted by adjusting the reduced pressure in the chamber. The frictional drag tensions the tape. Each tape preferably passes over a separate vacuum chamber, and the reduced pressure in each vacuum chamber is preferably individually adjustable so that the tension applied to each tape is individually adjustable. If desired, a vacuum chamber may be provided for each tape to which glue is applied both before and after the glue application point so that in addition to tensioning the tape when the machine is running, these vacuum chambers positively control or hold the tape in place when the machine is not running. This prevents the tape from becoming entangled in the glue applying apparatus when a tape breaks, while the machine is stopped, or when the machine restarts. It also facilitates automatically moving the tape out of contact with the glue applying element when the machine is stopped, which is another advantageous feature of the invention.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
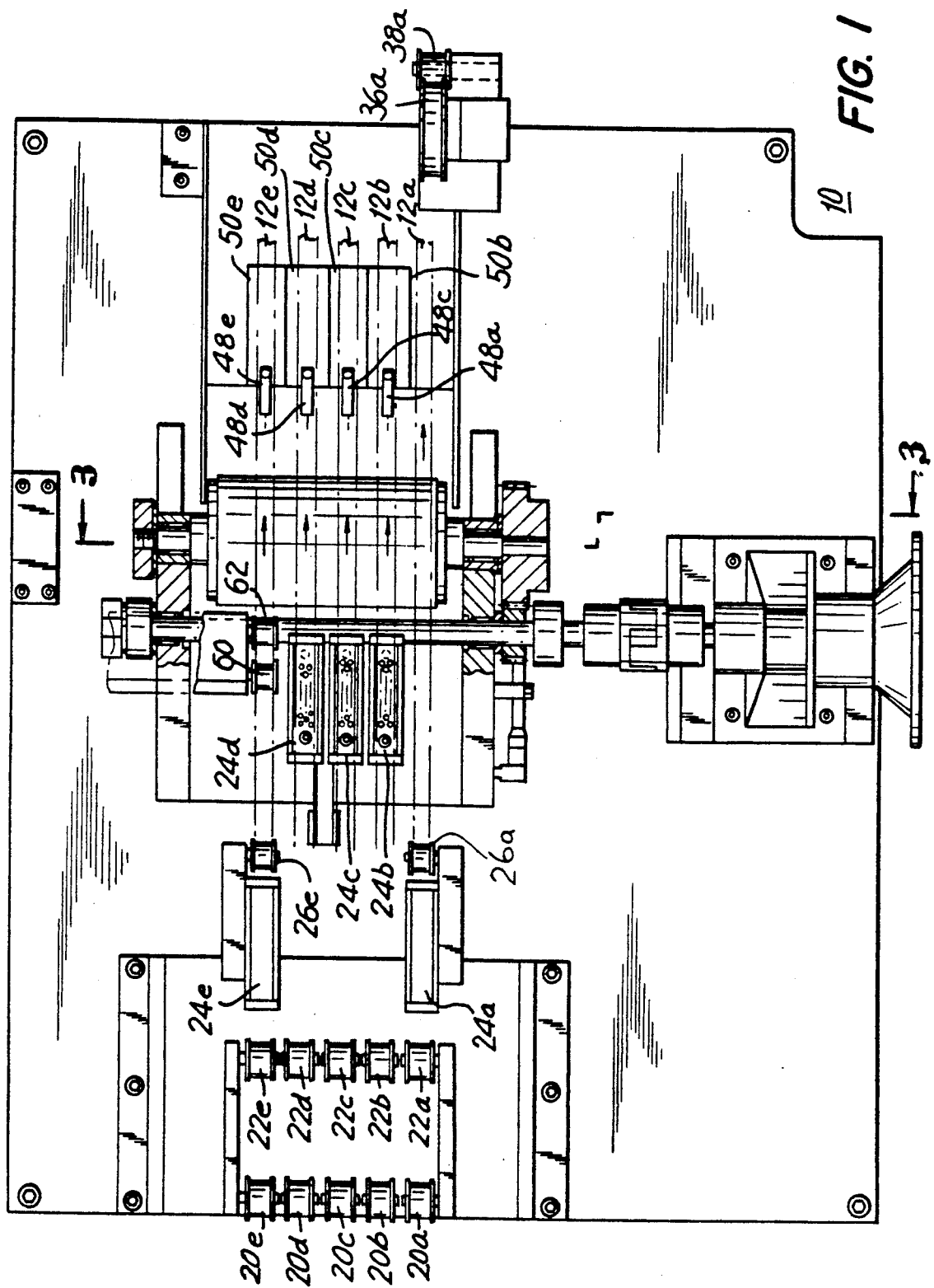
FIG. 1 is a plan view, partly in section, of an illustrative embodiment of the tensioning and glue applying apparatus of this invention.
Figure 2:
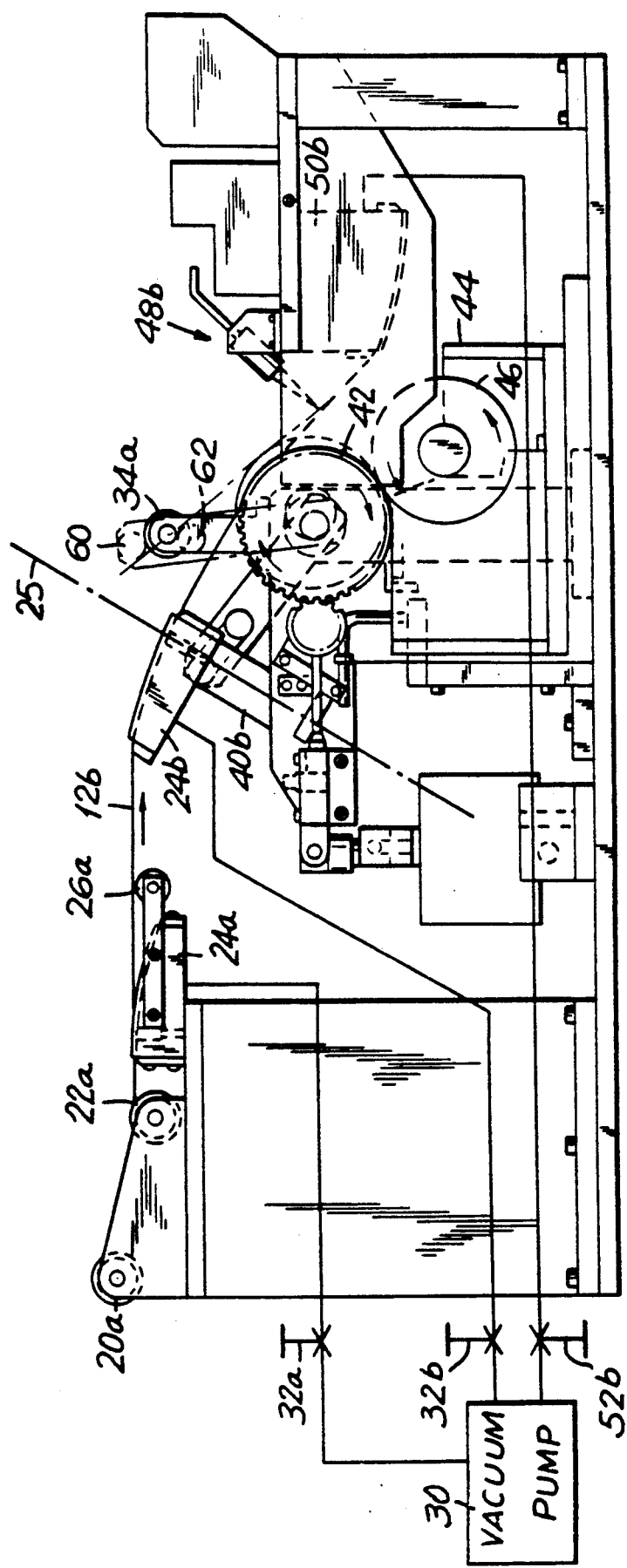
FIG. 2 is a side elevational view, with certain parts removed for clarity, of the apparatus of FIG. 1.

Although the principles of this invention are applicable to handling any number of strips or tapes going to the mandrel of a tube winding machine, the invention will be fully understood from the following explanation of its application to an illustrative embodiment in which five tapes 12a-e are supplied to such a mandrel. The tapes typically originate from reels (not shown because conventional) and, after passing through the tensioning and gluing apparatus 10 of this invention, go to the mandrel of the actual tube winding machine (also not shown because conventional). In FIGS. 1 and 2 the tapes pass through apparatus 10 from left to right. (For greater clarity in the drawings not all portions of the paths of all the tapes are shown in every view.) Tape 12a will be the inner tape in the finished tube; tape 12e will be the outer tape in the finished tube; and tapes 12b-d will be intermediate tapes in the finished tube. In the particular embodiment shown in the drawings tape 12a receives no glue; tapes 12b-d receive moderate amounts of glue on the under side; and tape 12e receives a relatively large amount of glue, also on the under side.

To illustrate the point that tapes 12a–e may be quite different from one another, the apparatus could be set up to produce a tube which is basically paper but which has an inner surface of aluminum foil and an outer surface of aluminum foil. In that event, tape 12a could be a laminate of aluminum foil (on the under side which becomes the inside surface of the finished tube) and paper. Tapes 12b–d could be simple paper strips. And tape 12e could be another laminate of aluminum foil (on the upper side which becomes the outer surface of the finished tube) and paper.

Figure 4:
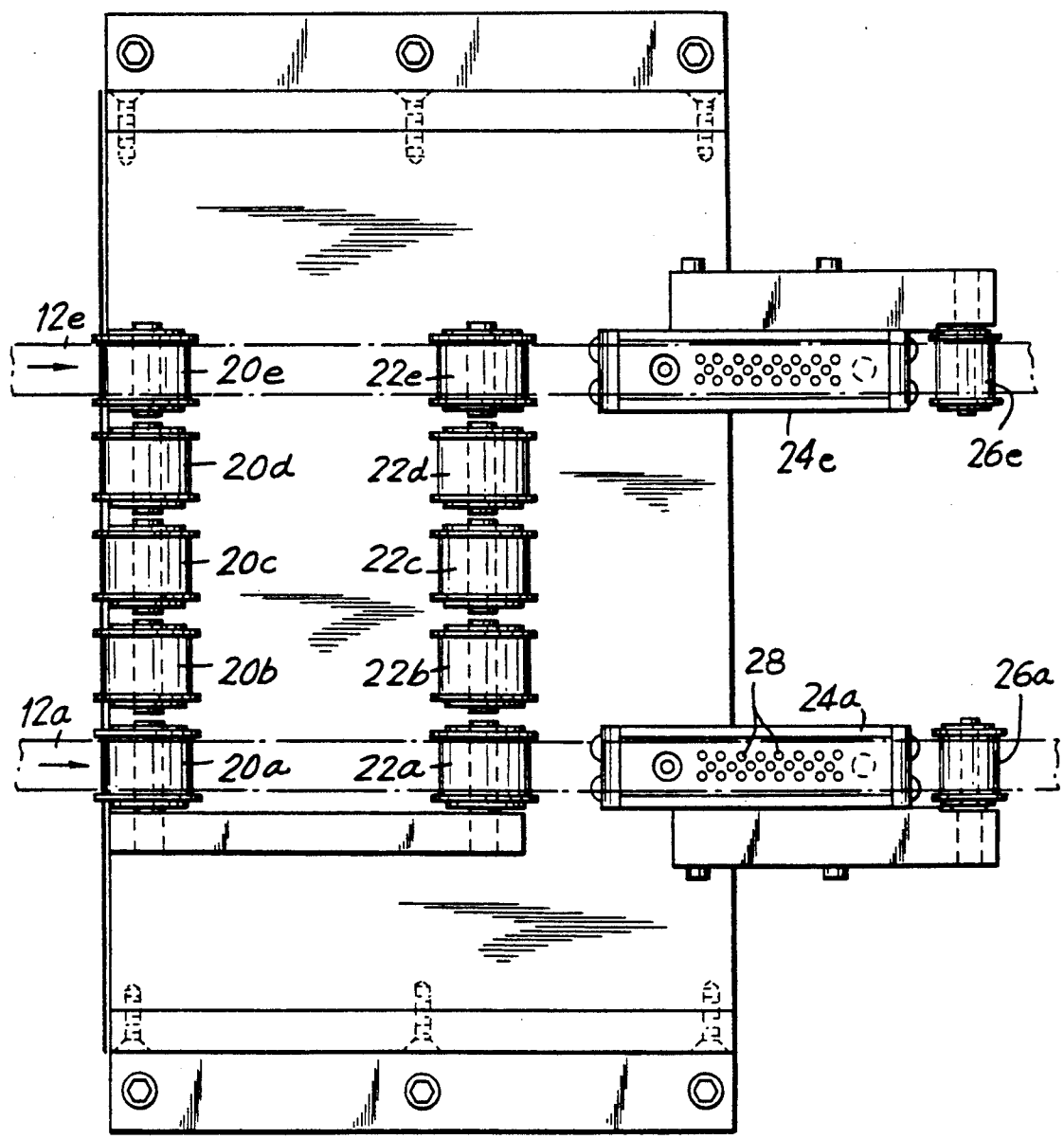
FIG. 4 is an enlarged, more detailed view of the left-hand portion of FIG. 1.
Figure 5:
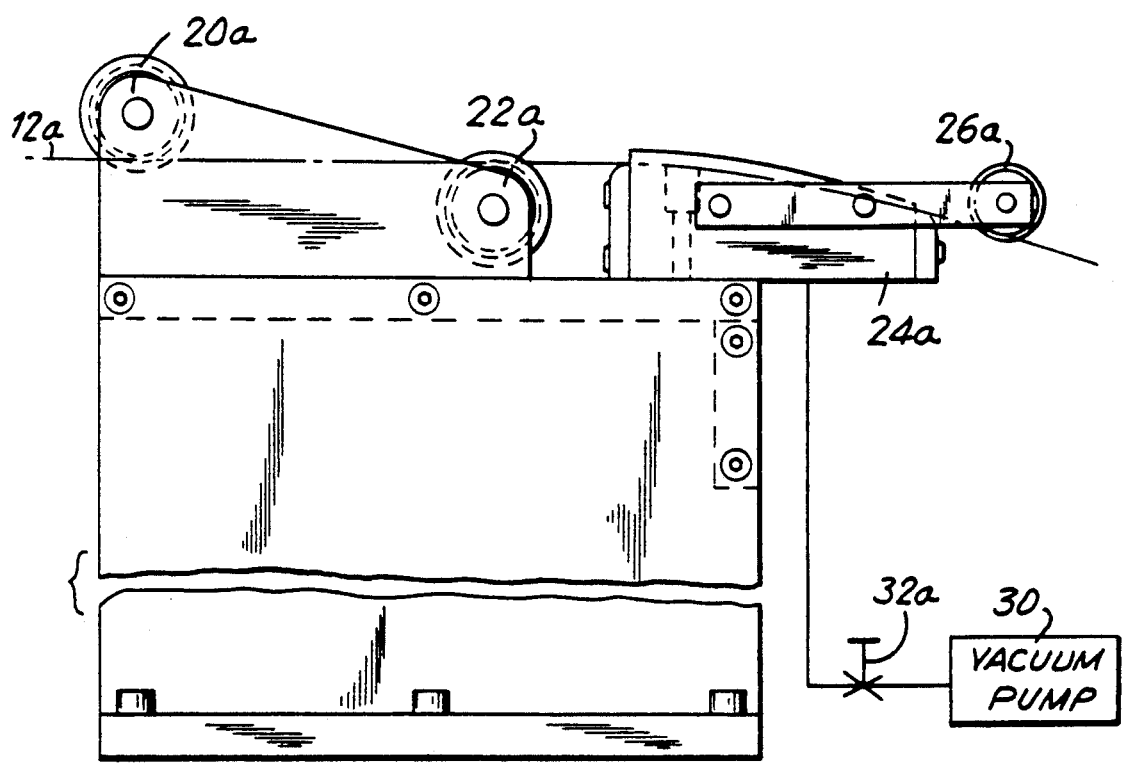
FIG. 5 is a side elevational view of the apparatus of FIG. 4.

All five tapes 12a–e enter the apparatus from the left as viewed in FIGS. 1, 2, 4, and 5. (FIGS. 4 and 5 are enlargements of the left-hand portions of FIGS. 1 and 2.) Each tape passes under a respective one of idler rollers 20 and then over a respective one of idler rollers 22. Inner tape 12a then passes over vacuum chamber 24a and under idler roller 26a. Vacuum chamber 24a is a hollow chamber having perforations 28 in the portion of its upper surface which is in contact with the under side of tape 12a. The interior of chamber 24a is connected to vacuum pump 30 via a conduit preferably including control valve 32a. Vacuum pump 30 operates to reduce the pressure in chamber 24a by an amount controlled by valve 32a. Accordingly, the difference between atmospheric pressure outside chamber 24a and the reduced pressure inside chamber 24a presses the underside of tape 12a against the perforated surface of chamber 24a by an amount proportional to the pressure difference inside and outside chamber 24a. This imposes a frictional drag on tape 12a and thereby tensions the tape for proper feeding to the mandrel of the actual winding machine (not shown). The greater the pressure reduction inside chamber 24a, the greater the frictional drag on tape 12a and the greater the tension in that tape. The surface of vacuum chamber 24a which contacts tape 12a is preferably convexly curved parallel to the axis of motion of tape 12a. This helps smooth out tape 12a, thereby ensuring good contact between the tape and the vacuum chamber surface over that entire surface. This, in turn, prevents any "breakage" of the vacuum holding the tape to the vacuum chamber surface, thereby ensuring that the vacuum chamber has a constant tensioning effect on the tape.

Figure 3:
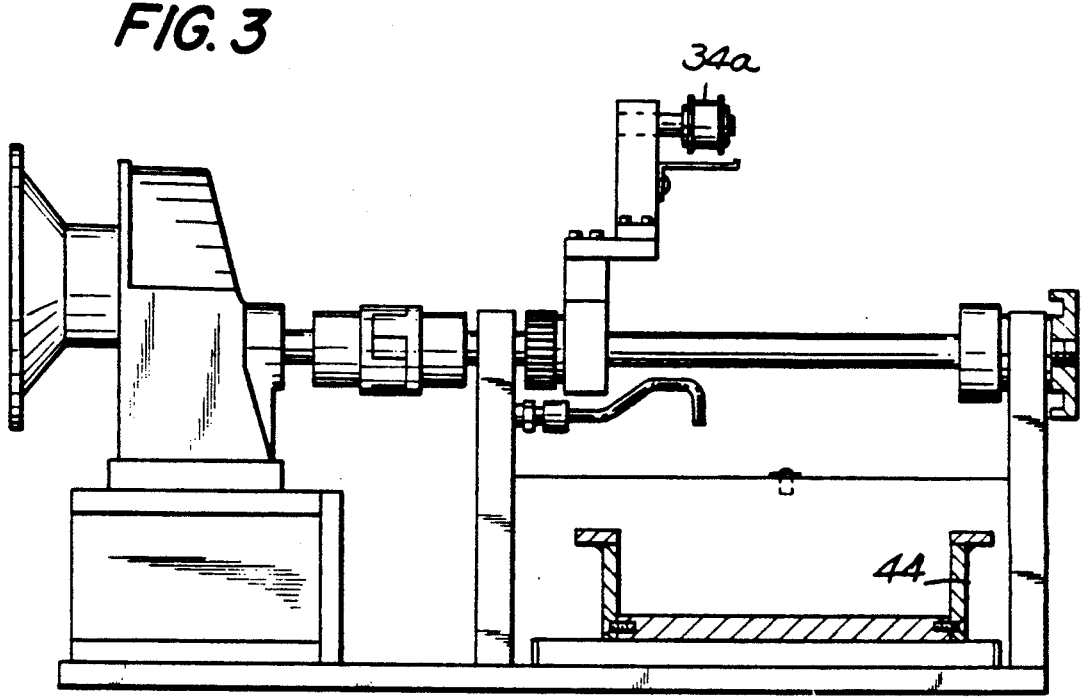
FIG. 3 is a transverse sectional view, again with certain parts removed for clarity, taken generally along the line 3—3 in FIG. 1.

As has been mentioned, in the depicted illustrative embodiment inner tape 12a receives no glue. However, the speed of inner tape 12a can be advantageously monitored to control various aspects of the tube-making process (e.g., the speed at which glue wheels 42 and 46 rotate as described below, and/or the rate at which a cutter (not shown) operates to cut off lengths of tube coming off the mandrel). For this purpose inner tape 12a passes under idler roller 34a (FIGS. 2 and 3), then over encoding wheel 36a (FIG. 1) and under idler wheel 38a. From idler wheel 38a, tape 12a passes to the mandrel (not shown) of the tube winding machine. Encoding wheel 36a is connected to a conventional transducer for producing an electrical output signal having a characteristic which is a function of the rate at which encoding wheel 36a rotates. This electrical output signal is used to control other functions of the machine as mentioned above.

As shown in FIGS. 1 and 2, tapes 12b–d go from idler rollers 22b–d to pass over vacuum chambers 24b–d, respectively. Each of vacuum chambers 24b–d is similar to vacuum chamber 24a, and each is connected to vacuum pump 30 via a valve (e.g., 32b) similar to valve 32a for individually controlling the vacuum in each chamber. Accordingly, each vacuum chamber 24b–d applies a controllable amount of frictional drag and therefore tension to the associated tapes 12b–d.

From vacuum chambers 24b–d, tapes 12b–d pass over glue roller 42, under vacuum chambers 50b–d, and then go to the mandrel of the winding machine. Vacuum chambers 50b–d are similar to vacuum chambers 24, and he suction applied to each of these chambers is also preferably individually controlled by a valve 52b–d in the conduit connecting each chamber 50 to vacuum pump 30. Vacuum chambers 50b–d apply additional frictional drag and therefore tension to tapes 12b–d, and also keep the associated tapes taut between chambers 24 and 50 when the machine is stopped as will be discussed in detail below.

In passing over glue roller 42, the under side of each tape 12b–d picks up some glue which is applied to glue roller 42 from glue pot 44 via glue roller 46. Glue roller 42 rotates clockwise as viewed in FIG. 2, while glue roller 46 rotates counterclockwise.

Whereas vacuum chamber 24a (discussed above) and vacuum chamber 24e (discussed below) are typically stationary, vacuum chambers 24b–d are preferably mounted for longitudinal reciprocation parallel to axis 25 in FIG. 2. Each of vacuum chambers 24b–d is preferably mounted on a separate linear pneumatic actuator 40b–d (only actuator 40b being visible in FIG. 2) disposed below the vacuum chamber and aligned with axis 25. When the machine is stopped, actuators 40b–d preferably automatically extend to raise vacuum chambers 24b–d by an amount sufficient to lift tapes 12b–d out of contact with glue roller 42. Note also that the presence of a vacuum chamber 24b–d and 50b–d both before and after glue roller 42 keeps each of tapes 12b–d taut and therefore away from glue roller 42 while the machine is stopped. This prevents the stopped tapes from sticking to glue roller 42, from picking up too much glue at one point while stopped, etc. (Tape 12a does not require a vacuum chamber 50 for this purpose because it does not receive glue and can therefore be kept away from glue roller 42 by other means such as a sheet metal shield (not shown)). When the machine is restarted, actuators 40b–d retract to bring the under side of tapes 12b–d back into contact with the surface of glue roller 42 so that the tapes resume picking up glue from that roller.

The amount of glue picked up by each of tapes 12b–d is dependent in part on the length of the arc of the glue roller surface contacted by that tape. The larger this arc (also called the glue roller wrap), the greater the amount of glue picked up. The glue roller wrap for each of tapes 12b–d is controlled by the extent to which the associated vacuum chamber 24b–d is retracted by the associated actuator 40b–d. The retraction stroke of each actuator 40b–d can be controlled, for example, by mounting a movable stop on the actuator rod. Alternatively, spacers of various thicknesses could be interposed between the bottom of each vacuum chamber 24b–d and the top of associated actuator 40b–d. In this way, the retraction stroke of each actuator 40b–d can be individually controlled to give the desired glue roller wrap for each of tapes 12b–d, thereby allowing the amount of glue picked up by each tape 12b–d to be individually controlled.

In traveling from glue roller 42 to vacuum chambers 50b–d, each of tapes 12b–d passes under a respective one of tape sensor assemblies 48b–d. Each of tape sensor assemblies 48b–d includes a light source for directing light onto the surface of the tape passing under that light source, and a photodetector for detecting light reflected from that tape surface. If a tape is not present at the proper location relative to the associated tape sensor assembly, the photodetector in that assembly does not receive the required amount of reflected light and the resulting abnormal photodetector output signal can be used to stop the machine and/or to produce any desired indication of machine malfunction. (Note that tape 12a does not need a sensor assembly 48 because encoding wheel 36a can perform a similar function for that tape.)

Outer tape 12e initially follows a path similar to that of inner tape 12a. In particular, tape 12e passes under idler roller 20e, over idler roller 22e, over vacuum chamber 24e, and under idler roller 26e. Vacuum chamber 24e is similar to vacuum chamber 24a, and the vacuum in chamber 24e is preferably individually controlled (by a valve like valve 32a in the connection between vacuum chamber 24e and vacuum pump 30) to impart a desired amount of tension to tape 12e.

Figure 6:
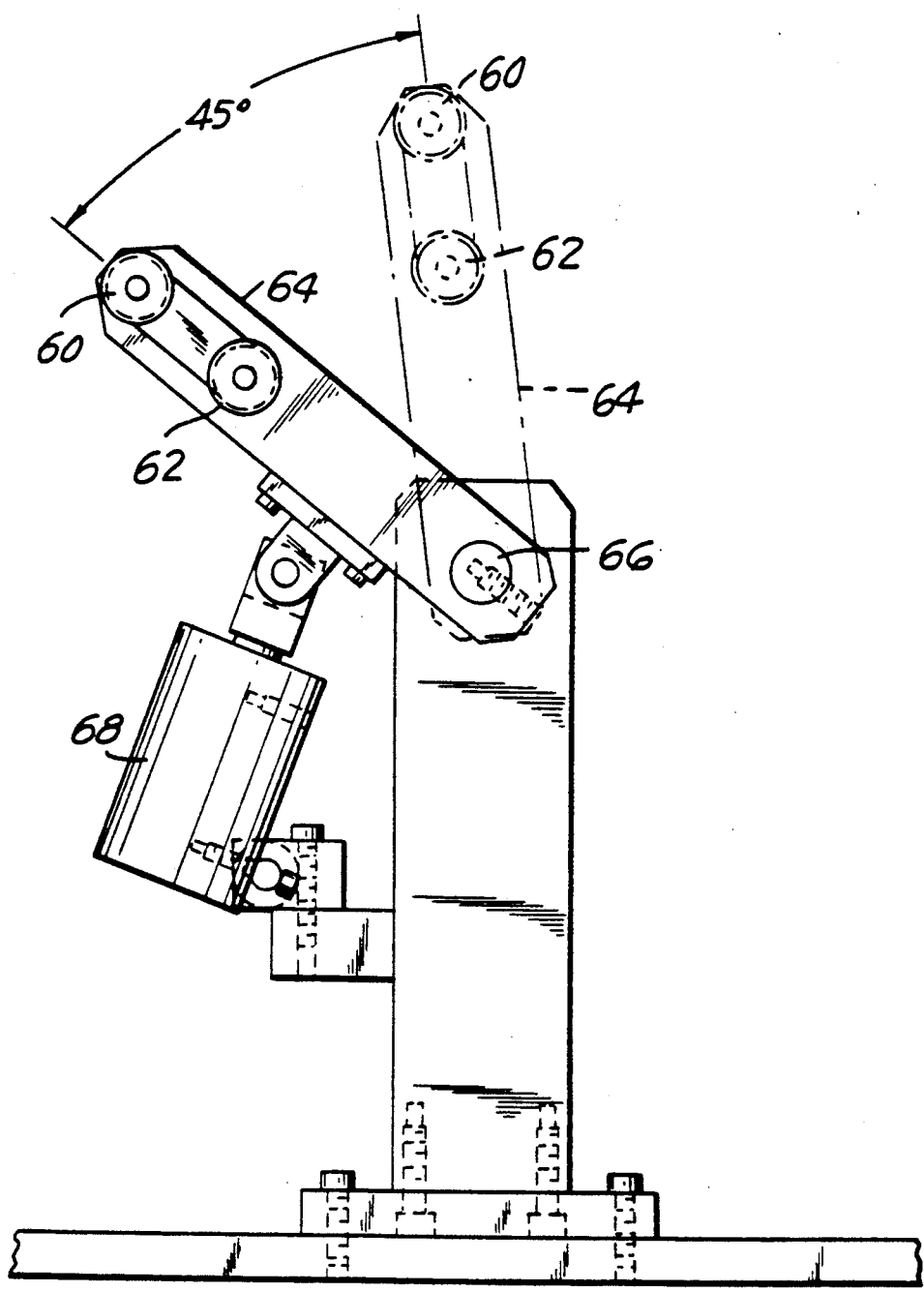
FIG. 6 is an enlarged, more detailed view of a portion of FIG. 2.

From idler roller 26e tape 12e travels to idler roller 60 (shown in more detail in FIG. 6). Tape 12e passes over idler wheel 60 and then under idler wheel 62. From idler wheel 62 tape 12e passes over glue roller 42 (where it picks up glue on its under side) and then under sensor assembly 48e (similar to assemblies 48b–d). After passing assembly 48e, tape 12e passes under vacuum chamber 50e, which (like the other similar vacuum chambers 50b–d) is preferably individually controlled (by a valve like valve 32a in the connection between vacuum chamber 50e and vacuum pump 30) to impart additional tension to tape 12e. From vacuum chamber 50e tape 12e goes to the mandrel of the tube winding machine.

Because outer tape 12e may require more glue than intermediate tapes 12b–d, the glue roller wrap of tape 12e is preferably adjustable to a greater degree than the glue roller wrap of tapes 12b–d. This is accomplished by mounting idler wheels 60 and 62 on an arm 64 which is pivotable about axis 66 by linear actuator 68. When linear actuator 68 is fully extended, arm 64 is in the nearly vertical position shown in dotted lines in FIG. 6. In this position tape 12e does not contact glue roller 42 at all. Accordingly, actuator 68 preferably drives arm 64 to this position whenever the machine stops. As in the case of tapes 12b–d, vacuum chambers 24e and 50e keep tape 12e sufficiently taut even when the forward motion of the tape stops to help elements 60, 62, and 64 keep tape 12e off glue roller 42 when arm 64 is raised. When linear actuator 68 is retracted, arm 64 is lowered toward the position shown in solid lines in FIG. 6, and tape 12e contacts an arc of the surface of glue roller 42. The length of this arc depends on the amount of retraction of actuator 68, and this can be controlled, for example, by interposing spacers or an adjustable stop between the body of the actuator and the upwardly extending end portion of the actuator rod.

From the foregoing it will be understood that pivoting arm 64 acts very much like the above-described raising and lowering of vacuum chambers 24b–d, except that the amount of motion is amplified by the lever effect of arm 64. Accordingly, a much greater range of adjustment of the glue roller wrap of outer tape 12e is possible, as is desirable for a tape which may require more glue than the other tapes.

Figure 7:
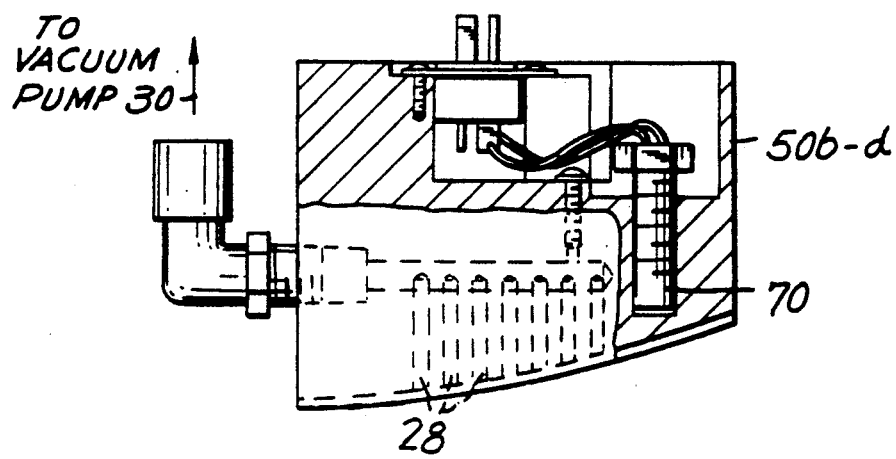
FIG. 7 is a partly sectional view of a portion of the apparatus shown in FIGS. 1 and 2.

If desired to promote earlier or more rapid curing of the glue applied to any one or more of the tapes to which glue is applied, the second vacuum chamber 50b–e over which such tapes pass may include a heat source such as an electric heater 70 (see FIG. 7). Heater 70 heats the surface of the associated vacuum chamber 50 in order to heat the tape passing in contact with that surface. This in turn heats the glue on the tape, thereby promoting more rapid curing of the glue in the finished tube. It is advantageous to include heater 70 in a vacuum chamber because the vacuum holds the tape against the surface of the vacuum chamber, thereby improving heat transfer from the vacuum chamber surface to the tape.

It will be understood that the foregoing is merely illustrative of the principles of this invention, and that various modifications can be made by those skilled in the art without departing from the scope and spirit of the invention. For example, although five tapes are handled by the depicted apparatus, it will be readily apparent how the apparatus can be modified to handle a greater or lesser number of tapes if desired.

What is claimed is:

1. Apparatus for handling a tape being pulled along a predetermined path toward the mandrel of a tube winding machine comprising:
    a perforated surface in contact with one side of said tape;
    means for producing relative motion between said tape and said perforated surface parallel to said predetermined path, said motion of said tape relative to said perforated surface being in the direction along said path toward said mandrel; and
    means for applying a subatmospheric gas pressure to the side of said perforated surface remote from said tape in order to press said tape against said surface and thereby cause said surface to impart frictional drag to said tape, said frictional drag resisting but not preventing said motion of said tape relative to said perforated surface.

2. The apparatus defined in claim 1 wherein said perforated surface is convexly curved parallel to the axis of motion of said tape toward said mandrel.

3. The apparatus defined in claim 1 further comprising:
    means for heating said perforated surface in order to heat said tape in contact with said perforated surface.

4. The apparatus defined in claim 3 further comprising:
    means for applying glue to the side of said tape remote from said perforated surface prior to said tape contacting said perforated surface.

5. Apparatus for handling a tape being pulled along a predetermined path toward the mandrel of a tube winding machine comprising:
    means for causing said tape to be pulled toward said mandrel;
    means for applying glue to at least one side of said tape, said means for applying being upstream along said path from said means for causing;
    first means for imparting frictional drag to said tape in order to resist but not prevent the motion of said tape toward said mandrel produced by said means for causing, said first means acting on said tape in advance of said means for applying glue; and
    second means for imparting frictional drag to said tape in order to further resist but not prevent the motion of said tape toward said mandrel produced by said means for causing, said second means acting on said tape after said means for applying glue.

6. The apparatus defined in claim 5 wherein said first means comprises:
   a perforated surface in contact with one side of said tape, said tape moving relative to said surface in the direction along said path toward said mandrel; and
   means for applying a subatmospheric gas pressure to the side of said perforated surface remote from said tape in order to press said tape against said surface and thereby cause said surface to impart frictional drag to said tape.

7. The apparatus defined in claim 5 wherein said second means comprises:
   a perforated surface in contact with one side of said tape, said tape moving relative to said surface in the direction along said path toward said mandrel; and
   means for applying a subatmospheric gas pressure to the side of said perforated surface remote from said tape in order to press said tape against said surface and thereby impart frictional drag to said tape.

8. The apparatus defined in claim 6 further comprising:
   means for allowing adjustment of said subatmospheric gas pressure.

9. The apparatus defined in claim 7 further comprising:
   means for allowing adjustment of said subatmospheric gas pressure.

10. The apparatus defined in claim 7 wherein said means for applying glue applies glue to only one side of said tape, and wherein said perforated surface is in contact with the unglued side of said tape.

11. The apparatus defined in claim 5 further comprising:
    means for heating said tape after said glue has been applied to promote curing of said glue.

12. The apparatus defined in claim 5 wherein said means for applying glue comprises:
    a convex surface in contact with said tape as said tape passes from said first means to said second means, said convex surface being coated with glue and causing the portion of said tape which is in contact with said convex surface to curve parallel to the direction of motion of said tape.

13. The apparatus defined in claim 12 further comprising:
    means for adjusting the length of the portion of said tape which is in contact with said convex surface in order to control the amount of glue applied to said tape.

14. The apparatus defined in claim 13 wherein said means for adjusting can completely remove said tape from contact with said convex surface.

15. The apparatus defined in claim 5 wherein said first and second means cooperate with one another to keep said tape taut between said first and second means even when the motion of said tape toward said mandrel stops.

16. Apparatus for handling a tape being pulled toward the mandrel of a tube winding machine comprising:
    a glue-bearing surface which is convex parallel to the axis of motion of said tape toward said mandrel;
    first means for guiding said tape toward said surface;
    second means for guiding said tape away from said surface; and
    means for controlling the position of at least one of said first and second means in order to control the circumferential extent to which said tape contacts said glue-bearing surface, wherein said means for controlling includes means for positioning said at least one of said first and second means to remove said tape from contact with said glue-bearing surface in response to any stoppage of the motion of said tape toward said mandrel.

17. The method of handling a tape being pulled along a predetermined path toward the mandrel of a tube winding machine comprising the steps of:
    passing said tape over a perforated surface;
    producing relative motion between said tape and said perforated surface parallel to said predetermine path, said motion of said tape relative to said perforated surface being in the direction along said path toward said mandrel; and
    applying a subatmospheric gas pressure to the side of said perforated surface remote from said tape in order to press said tape against said surface and thereby cause said surface to impart frictional drag to said tape, said frictional drag resisting but not preventing said motion of said tape relative to said perforated surface.

18. The method defined in claim 17 further comprising the step of:
    heating said perforated surface in order to heat said tape in contact with said perforated surface.

19. The method defined in claim 18 further comprising the step of:
    applying glue to the side of said tape remote from said perforated surface prior to said tape contacting said perforated surface.

20. The method of handling a tape being pulled along a predetermined path toward the mandrel of a tube winding machine comprising the steps of:
    applying a pulling force to said tape to pull said tape toward said mandrel;
    applying a first frictional drag force to said tape to resist but not prevent the motion of said tape toward said mandrel, said first frictional drag force being applied to said tape at a location which is upstream along said path from the location at which said pulling force is applied to said tape;
    applying glue to at least one side of said tape after the location at which said first retarding force is applied but before the location at which said pulling force is applied to said tape; and
    applying a second frictional drag force to said tape after the location at which said glue is applied but before the location at which said pulling force is applied to said tape to further resist but not prevent the motion of said tape toward said mandrel.

21. The method defined in claim 20 wherein said step of applying a first frictional drag force comprises the step of:
    pressing the tape against a stationary surface.

22. The method defined in claim 20 wherein said step of applying a second frictional drag force comprises the step of:
    pressing the tape against a stationary surface.

23. The method defined in claim 20 wherein said step of applying glue comprises the step of:
    passing a portion of the length of said tape over a convex glue-bearing surface.

24. The method defined in claim 23 further comprising the step of:
    adjusting the length of the portion of said tape in contact with said convex glue-bearing surface to adjust the amount of glue applied to said tape.

25. The method defined in claim 23 further comprising the step of:

removing the tape from contact with said convex glue-bearing surface in the event that motion of said tape toward said mandrel stops.

26. The method defined in claim 25 further comprising the step of:

maintaining said tape taut between the locations at which said first and second frictional drag forces are applied in the event that motion of said tape toward said mandrel stops.

27. The method defined in claim 20 further comprising the step of:

heating said tape after the location at which said glue is applied to promote curing of said glue.

28. The method of handling a tape being pulled toward the mandrel of a tube winding machine comprising the steps of:

providing a glue-bearing surface which is convex parallel to the axis of motion of said tape toward said mandrel;

guiding said tape toward and away from said surface so that a portion of the length of said tape parallel to said axis of motion of said tape contacts said surface; and removing said tape from contacting said glue-bearing surface while the motion of said tape toward said mandrel is stopped.

* * * * *